United States Patent

Gocek et al.

(10) Patent No.: US 9,170,806 B2
(45) Date of Patent: *Oct. 27, 2015

(54) SOFTWARE DISCOVERY BY AN INSTALLER CONTROLLER

(71) Applicant: International Business Machines Corporation, Armonk, NY (US)

(72) Inventors: Pawel Gocek, Lodz (PL); Piotr Kania, Cracow (PL); Michal Paluch, Cracow (PL); Tomasz Stopa, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/474,343

(22) Filed: Sep. 2, 2014

(65) Prior Publication Data

US 2015/0089473 A1 Mar. 26, 2015

Related U.S. Application Data

(63) Continuation of application No. 14/034,590, filed on Sep. 24, 2013.

(51) Int. Cl.
*G06F 9/44* (2006.01)
*G06F 9/445* (2006.01)
*G06F 9/48* (2006.01)

(52) U.S. Cl.
CPC .. *G06F 8/70* (2013.01); *G06F 8/61* (2013.01); *G06F 9/485* (2013.01)

(58) Field of Classification Search
CPC ..................................... G06F 8/61; G06F 8/70
USPC .................................................. 717/120, 174
See application file for complete search history.

(56) References Cited

U.S. PATENT DOCUMENTS

| 8,234,639 | B2 | 7/2012 | Ramachandran et al. | |
| 8,595,718 | B1 * | 11/2013 | Naslavsky et al. | 717/174 |
| 2014/0053145 | A1 * | 2/2014 | Steigleder | 717/169 |
| 2014/0137071 | A1 * | 5/2014 | Wadhwani et al. | 717/101 |
| 2015/0089473 | A1 * | 3/2015 | Gocek et al. | 717/120 |

OTHER PUBLICATIONS

Microsoft, Maintaining Your Software Asset management processes through Technology, Microsoft (2006) retrieved from http://www.projectleadership.net/pdfs/white-papers/App%20Solu%20White%20Paper%201.pdf on Nov. 17, 2014.*
IBM, "A method and apparatus for automatic software catalog population", IP.com, IPCOM000031874D, Oct. 15, 2004, pp. 1-3.
Pending U.S. Appl. No. 14/034,590 entitled "Software Discovery by an Installer Controller", filed Sep. 24, 2013.

* cited by examiner

*Primary Examiner* — Don Wong
*Assistant Examiner* — Theodore Hebert
(74) *Attorney, Agent, or Firm* — Teddi Maranzano

(57) ABSTRACT

A method for performing software discovery by an installer controller is provided and may include detecting, at a computer, an attempt by a software installer to execute on the computer, wherein during execution, the software installer modifies software on the computer. A Software Asset Management (SAM) computer server may be queried for an approval status corresponding to a software package provided by the software installer. The installer controller executes the software installer upon receiving on the returned approval status; aggregates a result from the execution of the software installer based on the software installer modifying the software on the computer; and updates a discovery software signature on the computer when the returned approval status is marked as known.

5 Claims, 4 Drawing Sheets

SOFTWARE DISCOVERY BY AN INSTALLER CONTROLLER

CROSS REFERENCE

The present application is a continuation of and claims priority under 35 U.S.C. §120 of U.S. patent application Ser. No. 14/034,590, filed on Sep. 24, 2013, which is incorporated by reference in its entirety.

FIELD

The present disclosure relates generally to the field of computer systems, and more particularly, to building a catalog of installed software.

BACKGROUND

Software is commonly deployed on computer desktops by an installation package that may be provided by a software vendor. A user invokes an installer program, which extracts and copies files from the installation package and then adds information about the software to platform-dependent locations, such as a registry, where the operating system may manage the software inventory. Exemplary installer programs that the software vendor may use to package and deploy popular software include InstallAnywhere and InstallShield. Actions performed by an installer program are well-defined and may be monitored and customized depending on for example, the requirements of the software vendor or the software management guidelines at a business enterprise's computer environment.

Current Software Asset Management (SAM) solutions for performing software discovery within a computer environment often include distributing a software catalog to agents that are running on client workstations. The software catalog may include a set of discovery rules for the agents to use for each software package or program when scanning filesystems, registries, lists of running processes, and the like. However, computing resources may be unnecessarily used on redundant scans of client workstations, even though no software deployment activities have occurred. Additionally, considering the diversity of software products likely to be found in a business enterprise's computing environment, the maintenance costs associated with the software catalogs may be prohibitive.

BRIEF SUMMARY

Among other things, a method and system of performing software discovery by an installer controller is provided. According to an embodiment of the invention, a method of performing software discovery by an installer controller may include: detecting, at a computer, an attempt by a software installer to execute on the computer, wherein during execution, the software installer modifies software on the computer; querying a Software Asset Management (SAM) computer server for an approval status corresponding to a software package provided by the software installer; executing the software installer upon receiving the returned approval status; aggregating a result from the execution of the software installer based on the software installer modifying the software on the computer; and updating a discovery software signature on the computer when the returned approval status is marked as known.

In another embodiment of the invention, a computer program product for performing software discovery by an installer controller may be provided. The computer program product may include an installer controller of SAM system embodied on a computer readable storage medium. The installer controller may include code executable by a processor to perform a method that may include detecting, at a computer, an attempt by a software installer to execute on the computer, wherein during execution, the software installer modifies software on the computer; querying a Software Asset Management (SAM) computer server for an approval status corresponding to a software package provided by the software installer; executing the software installer upon receiving the returned approval status; aggregating a result from the execution of the software installer based on the software installer modifying the software on the computer; and updating a discovery software signature on the computer when the returned approval status is marked as known.

In another embodiment of the invention, a computer system for performing software discovery by an installer controller may be provided. The computer system may include one or more processors, one or more computer-readable storage devices, and a plurality of program instructions stored on at least one of the one or more storage devices for execution by at least one of the one or more processors. The plurality of program instructions may include program instructions to detect, at a computer, an attempt by a software installer to execute on the computer, wherein during execution, the software installer modifies software on the computer; program instructions to query a Software Asset Management (SAM) server for an approval status corresponding to a software package provided by the software installer; program instructions to execute the software installer upon receiving the returned approval status; program instructions to aggregate a result from the execution of the software installer based on the software installer modifying the software on the computer; and program instructions to update a discovery software signature on the computer when the returned approval status is marked as known.

BRIEF DESCRIPTION OF THE SEVERAL VIEWS OF THE DRAWING

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Embodiments of the present invention will now be described with reference to the figures. Referring to FIGS.

1-2B, a system 100 and method 200 provide an exemplary implementation for performing software discovery by an installer controller.

Figure 1:
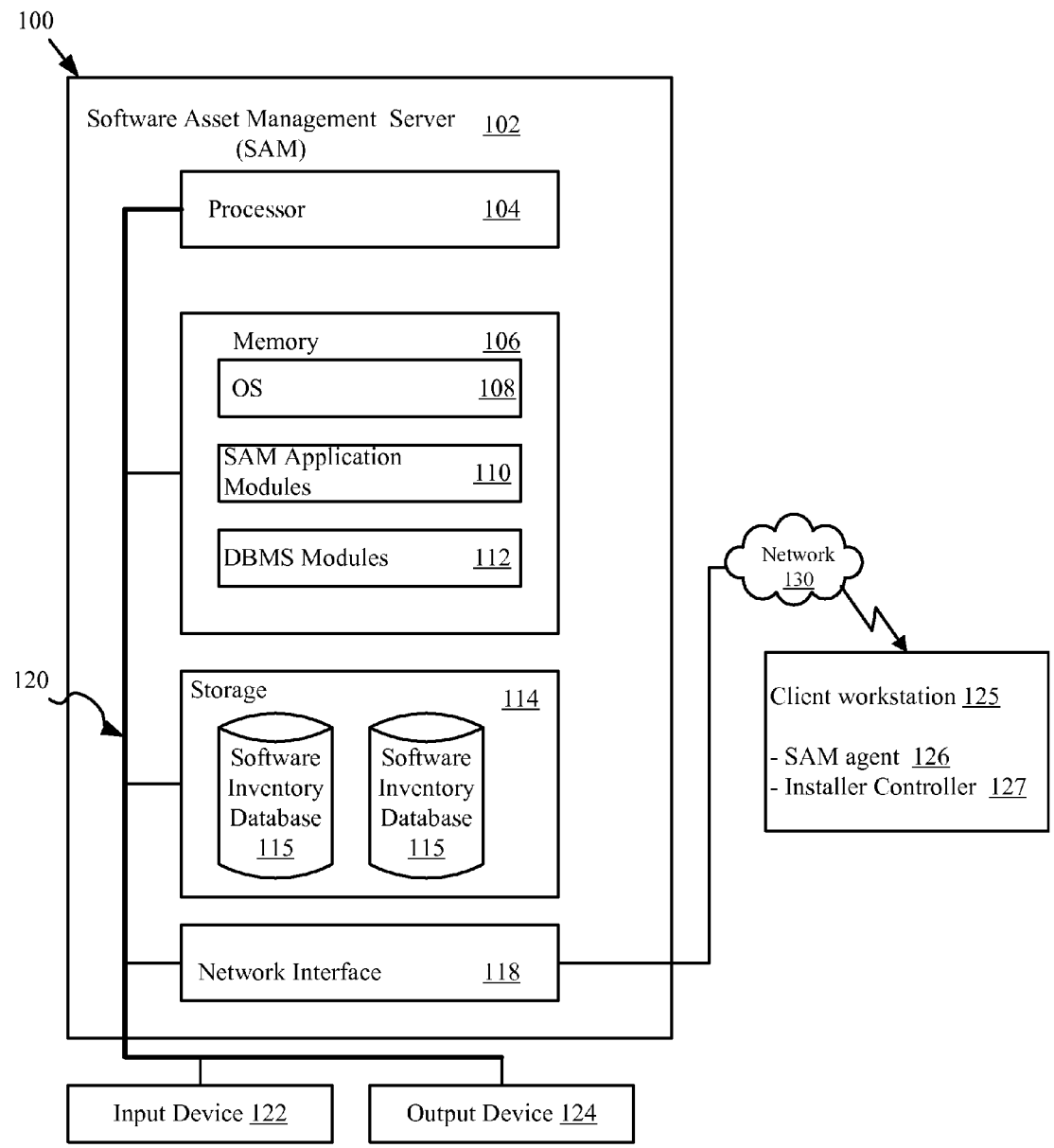
FIG. 1 is a block diagram illustrating an exemplary embodiment of a system for performing software discovery by an installer controller.

FIG. 1 is a block diagram illustrating an exemplary embodiment of a system 100 for performing software discovery by an installer controller. The networked system 100 includes a Software Asset Management Server (SAM) server 102. The SAM server 102 may also be connected to other computers and servers via a network 130. In general, the network 130 may be a telecommunications network and/or a wide area network (WAN). In a particular embodiment, the network 130 is the Internet.

The SAM server 102 generally includes a processor 104 connected via a bus 120 to a memory 106, a network interface device 118, a storage 114, an input device 122, and an output device 124. The SAM server 102 is generally under the control of an operating system 108, such as for example Linux. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the SAM server 102 to communicate with other computers via the network 130.

The storage 114 may be a persistent storage device. Although the storage 114 is shown as a single unit, the storage 114 may be a combination of fixed and/or removable storage devices, such as fixed disc drives, solid state drives, floppy disc drives, tape drives, removable memory cards or optical storage. The memory 106 and the storage 114 may be part of one virtual address space spanning multiple primary and secondary storage devices.

The input device 122 may be any device for providing input to the SAM server 102. For example, a workstation configured with a keyboard and/or a mouse may be used. A SAM administrator may use the input device 122 to manage the operations of the SAM server 102. The output device 124 may be any device for providing output to a user of the SAM server 102. For example, the output device 124 may be any conventional display screen or set of speakers. Additionally, the output device 124 may be a printer to which the SAM administrator may send reports relating to software inventory. Although shown separately from the input device 122, the output device 124 and input device 122 may be combined. For example, a display screen with an integrated touch-screen may be used.

As shown, the memory 106 of the SAM server 102 includes SAM application modules 110 configured to manage the inventory contained in one or more software inventory databases 115, contained in the storage 114 of the SAM server 102. Each software inventory database 115 may store data used by the SAM server 102 to manage a software inventory catalog for business enterprise's computing environment. In an exemplary embodiment as shown, the memory 106 of SAM server 102 also contains DBMS modules 112 where a DBMS is associated with the SAM server 102 for the storage and management of the software inventory database(s) 115. A client workstation 125 is shown communicating with the SAM server through a network 130. Software modules, such as a SAM agent 126 and an installer controller 127 may be installed on the client workstation 125 to facilitate software inventory management from the SAM server 102.

The particular description in FIG. 1 is for illustrative purposes only; it should be understood that the invention is not limited to specific described embodiments, and any combination is contemplated to implement and practice the invention.

Figure 2A:
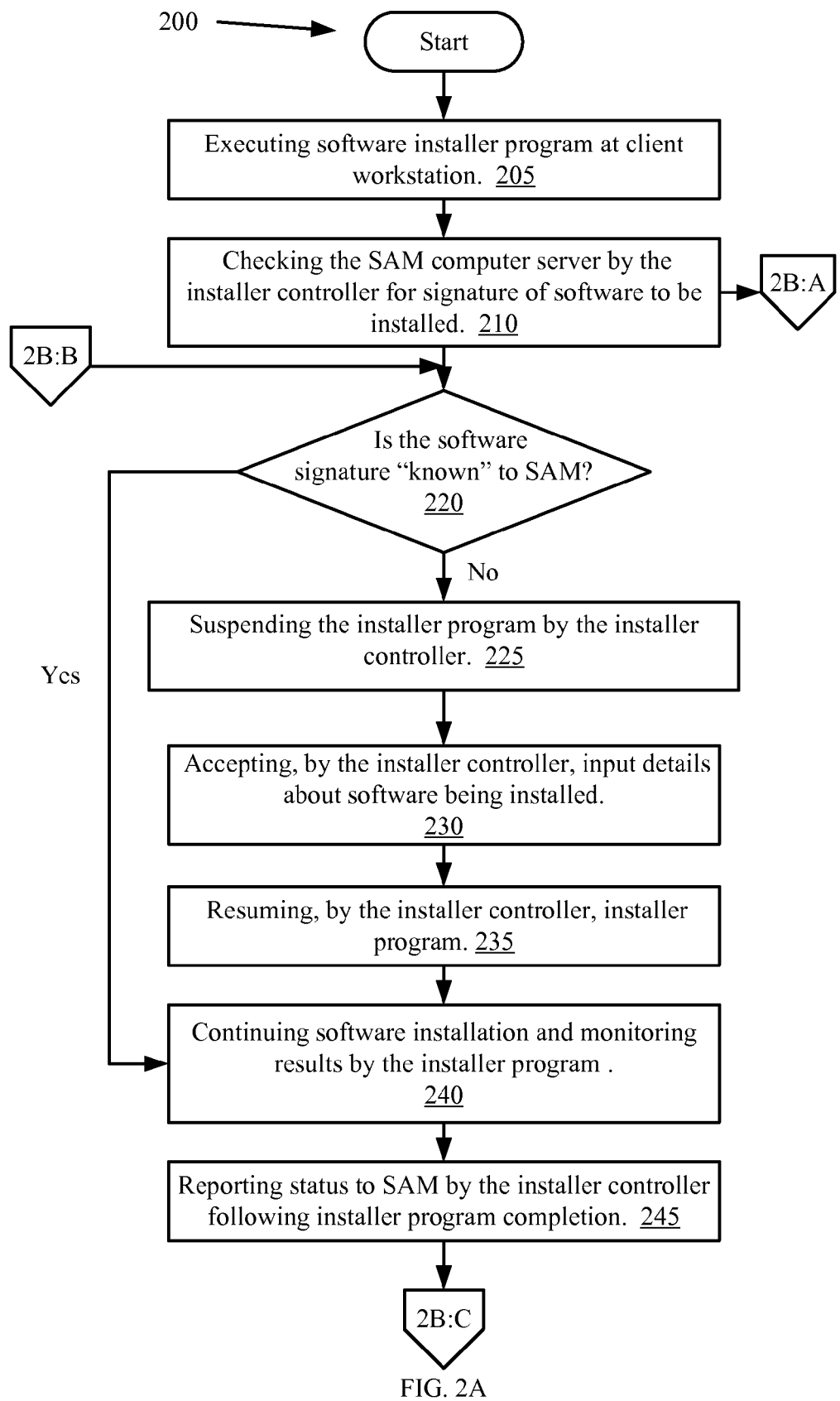
FIG. 2A is a flow diagram illustrating an overview of an exemplary embodiment of a method for performing software discovery by an installer controller from a client workstation's perspective.

Referring now to FIG. 2A, the reference numeral 200 generally designates a flow diagram illustrating an overview of an exemplary embodiment of a method for performing software discovery by an installer controller from a client workstation's perspective.

At 205, an end-user who wishes to install a software package on a client workstation 125, may access the software package by, for example, downloading it from a repository across a network or by mounting a device containing the software on the client workstation 125. The installer controller 127 may be configured to recognize a variety of software installer programs and their processes, such that when a process that is associated with one of these program (e.g., RPM for Linux or InstallShield for Windows) starts executing, the installer controller 127 recognizes that the end-user has invoked the software installer program, for example to update, install or otherwise modify software on the client workstation 125.

When the installer controller 127 recognizes, at 210, that a newly invoked process is a software installer program, the installer controller 127, through the SAM agent 126 on the client workstation 125, communicates with the SAM server 102 at 215 (FIG. 2B) to query whether a signature corresponding to the software package being provided by the software installer is contained in the inventory of the SAM server 102. In general, a signature may include a file name, a version identifier, an executable name, a registry entry, or other types of information which can be used to uniquely identify a given software item. Either alone or in conjunction with the SAM agent 126, the installer controller 127 may interrogate the proposed software package and extract signature-related information. The extracted signature-related information may be used in querying the SAM server 102 inventory to determine whether, at 220, a matching signature may be found.

Where at 220 a matching signature is found, indicating that the status of the proposed software package is "known" then the installer controller 127 may allow the software installer to continue with the software installation at 240 without interruption. The SAM administrator may approve software and mark it as "known" when, for example, the SAM administrator wants to continue to discover and maintain the software in the SAM-managed environment. However, the SAM administrator may reject the software but still mark it as "known" when, for example, the SAM administrator does not want to continue to discover and maintain the software in the SAM-managed environment.

If at 220 a matching signature is not found, indicating that the proposed software package is "unknown" (i.e., is not approved and does not exist in the SAM server 102 inventory), then the installer controller 127 may suspend execution of the software installer program at 225. The end-user is then prompted at 230 to input details about the software being installed, such as a vendor name, a source, a version, and a purpose for its use. The installer controller 127 may repeatedly prompt the end-user until the required information is entered, or alternatively, end the execution of the software installer program.

When the end-user enters the required information, then at 235 the installer controller 127 resumes the software installer and monitors the progress of the installation at 240. If the installation fails, the end-user may wish to troubleshoot and run the software installer again. However, when the installation completes at 245, the installation controller 127 may report to the SAM server 102, or other entity designated for data collection, the data input by the end-user, the raw inventory gathered during the installation, such as for example files that were created or changed on the client workstation 125, new registered services, and system registry entries. A return code corresponding to a completion status may also be included.

The installation controller 127 may also process a software uninstaller similar to the processing of an installer program. For example, the uninstaller process may be suspended when the software package is unknown, and the end-user may be prompted to enter input details about the software being installed, such as a vendor name, a source, a version, and a purpose for its use. The collected input details, raw inventory data, and return code corresponding to a completion status may be reported to the SAM server 102, or other entity designated for data collection. Similarly, if the end-user is installing a patch or update, then even though the software package is currently installed on the client workstation 125, the different release levels may have different hash values in the signature. Therefore, the installer controller 127 may follow the path of processing as if the software is unknown, prompting the end-user to input details, and reporting the collected input details, raw inventory data and return code to the SAM server 102 or other entity designated for data collection.

Figure 2B:
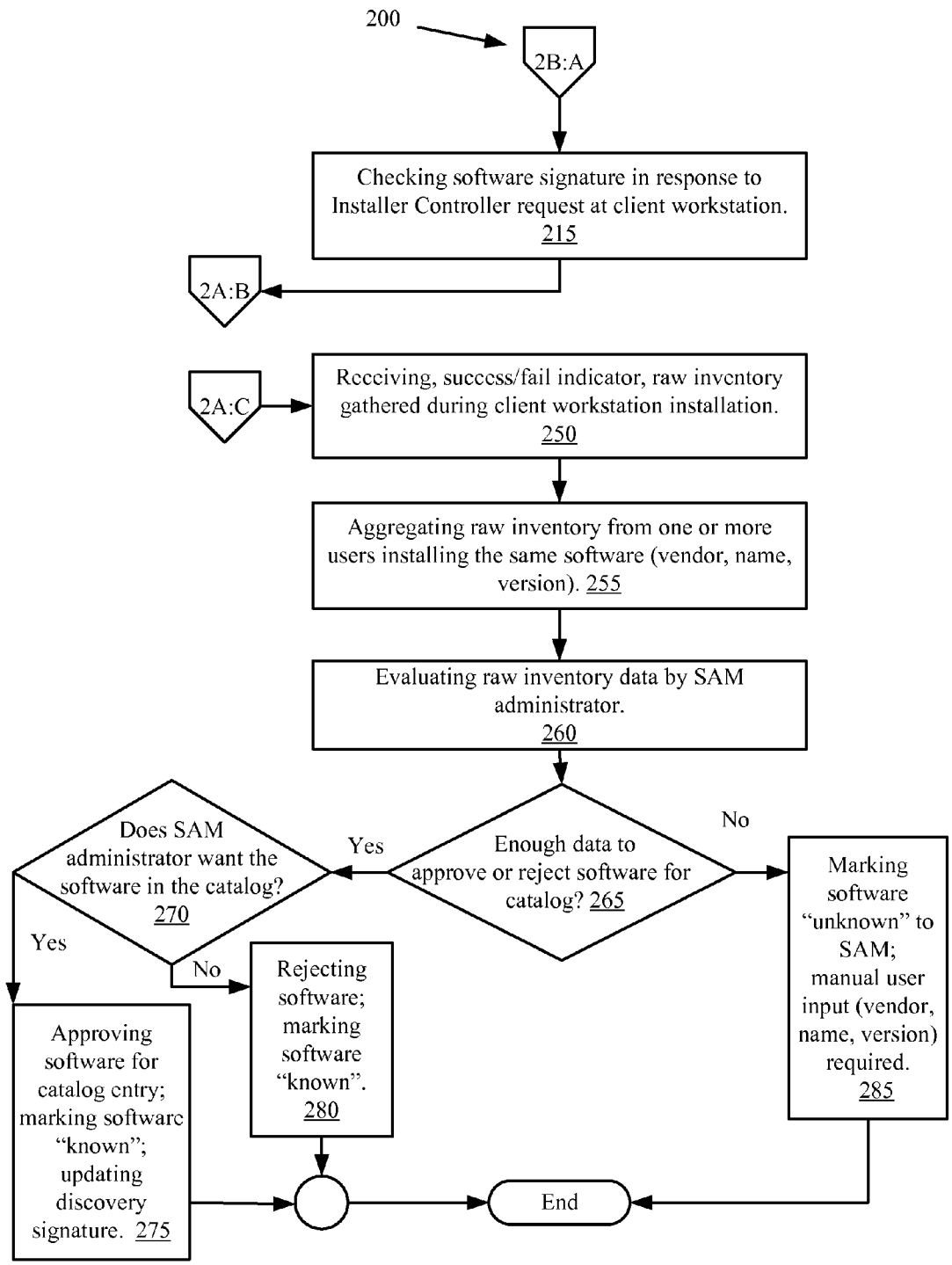
FIG. 2B is a flow diagram illustrating an exemplary embodiment of a method for performing software discovery by an installer controller from a SAM system's perspective.

Referring now to FIG. 2B, an exemplary embodiment of a method for performing software discovery by an installer controller is shown from a SAM system's perspective. At 250 the raw inventory data collected by the installer controller 127 may be received at the SAM server 102. Like entries are grouped together (e.g., vendor, version, software package name) at 255 and reported for the SAM administrator to evaluate at 260. Based on the number of occurrences in the SAM environment, the SAM administrator may approve a software package to be included and maintained in the SAM software catalog.

At 265, the SAM administrator may review the raw inventory reports prepared by the SAM server 102 to determine if there is enough information to make an evaluation about the software package's approval status. In one scenario, the software may be of interest. Perhaps a few end-users have installed it but they gave incorrect or incomplete data when prompted by the installer controller 127. In that case, at 285 the SAM administrator may mark the software as "unknown" in the SAM server 102. End-users may still install the software package, but with a status of "unknown" the installer controller 127 will still prompt end-users for input.

Where there is enough information to make an evaluation about a particular software package, the SAM administrator may then decide that the software package should be included and maintained in the SAM software catalog. In that case, at 275 the SAM administrator may approve the software package, and it will be marked as "known". The SAM server 102 may then generate a signature and a software catalog entry corresponding to the approved software package. In the future, end-users may install the software package without being prompted for input by the installer controller 127.

However, at 280 the SAM administrator may decide to reject the software package if it is something that should not be added to the software catalog. In this case, the SAM administrator may still mark the software as "known". The installer controller 127 will not generate a signature or a software catalog entry, but in the future end-users may install the software package without being prompted for input by the installer controller 127.

Once approved, the gathered raw inventory data may be used to automatically create a software discovery signature that may be added to the software catalog on the SAM server 102, and that also may be propagated back to the SAM agents 126 on client workstations 125. Software monitoring and discovery may be dynamically managed on the client workstations 125 through the installer controller 127 in conjunction with the SAM agent 126. For example, a new or missing registry entry, or a new running process may indicate a change to the software environment on the client workstation 125. When the installer controller 127 detects one these events, a change to the software inventory is begun by prompting the end-user for information about the software that triggered the event, in a similar manner to the software discovery process beginning in 205 (FIG. 2A). The resulting gathered raw inventory data may be reported to the SAM server 102 to update the software catalog, and generate an updated software discovery signature on the client workstation 125. An installer controller 127 working in conjunction with the SAM agent 126 may reduce unnecessary network traffic, since regularly scheduled scans of client workstations 125 may be avoided. Additionally, having the software discovery signatures on the client workstations 125 may tend to de-centralize software inventory management since, although local copies of the software catalog are not needed, a software catalog customized for the environment is provided automatically.

Figure 3:
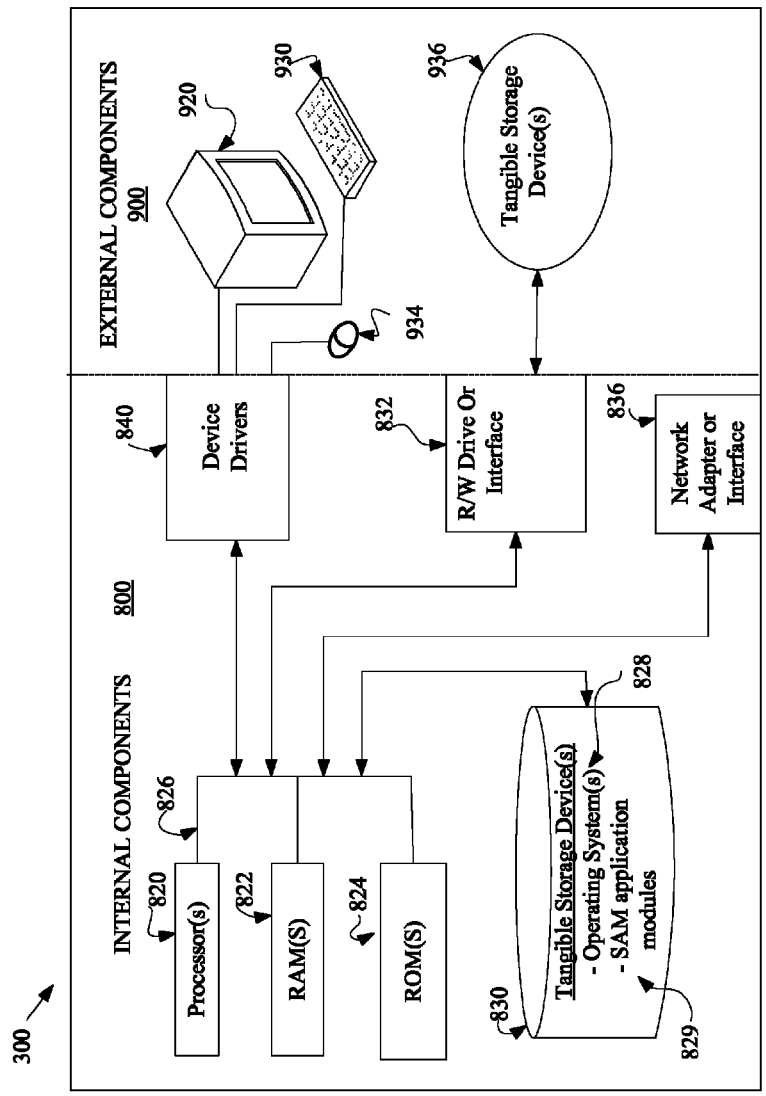
FIG. 3 is a schematic block diagram of hardware and software of the computer environment according to an embodiment of the method of FIGS. 2A-2B.

Referring now to FIG. 3, computing device 300 may include respective sets of internal components 800 and external components 900. Each of the sets of internal components 800 includes one or more processors 820; one or more computer-readable RAMs 822; one or more computer-readable ROMs 824 on one or more buses 826; one or more operating systems 828; one or more software applications (e.g., SAM modules 829) executing the method 200; and one or more computer-readable tangible storage devices 830. The one or more operating systems 828 and SAM modules 829 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The SAM 829 and operating system 828 that are associated with computing device 300, can be downloaded to computing device 300 from an external computer (e.g., server) via a network (for example, the Internet, a local area network, or other wide area network) and respective network adapters or interfaces 836. From the network adapters (or switch port adapters) or interfaces 836 and operating system 828 associated with computing device 300 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIGS. 1-3 illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for performing software discovery by an installer controller comprising:
   detecting, by the installer controller executing at a client computer, an execution of a software installer program;
   pausing, by the installer controller, the execution of the software installer program;
   comparing a first signature from a software package being modified by the software installer program to a second signature in a software catalog to determine whether the software package being modified is known in the software catalog, wherein the software catalog is managed by a software asset management (SAM) server and wherein the software catalog is stored on at least one of: the SAM server, and the client computer;
   resuming, by the installer controller, the execution of the software installer program, based on the first signature matching the second signature; and
   prompting an end-user to input details associated with the software package being modified, based on the first signature not matching the second signature, the inputted details including:
   a software package name,
   a version,
   a vendor,
   a source of the software package, and
   a business purpose.

2. The method of claim 1, further comprising:
   resuming, by the installer controller, the software installer program, based on the end-user inputting the details, wherein the inputted details are transmitted to the SAM server; and
   terminating, by the installer controller, the software installer program, based on the end-user not inputting the details.

3. The method of claim 1, further comprising:
   sending the inputted details, collected by the installer controller, to a data collection entity, wherein the data collection entity comprises at least one of:
   the SAM server,
   a computer designated for data collection, and
   an administrative computer server;
   sending a raw inventory data collected by the software installer program, based on a successful completion of the software installer program, to the data collection entity; and
   sending a return code corresponding to a completion status to the data collection entity.

4. The method of claim 3, wherein the raw inventory data comprises:
   a vendor name;
   at least one path name indicating a location of the software package;
   a name and contents of each changed file;
   a name and contents of each created file;
   a version identifier;
   at least one registry entry; and
   at least one service.

5. The method of claim 1, wherein modifying the software comprises at least one of:
   a software installation;
   a software uninstallation;
   a software repair; and
   a software update.

* * * * *